US008161611B2

(12) United States Patent
DiMambro et al.

(10) Patent No.: US 8,161,611 B2
(45) Date of Patent: Apr. 24, 2012

(54) TOOL FOR INSTALLATION OF TUBING IN FLOORING

(76) Inventors: Dominic A. DiMambro, North Billerica, MA (US); Raymond T. Kapala, Jr., Lowell, MA (US)

( * ) Notice: Subject to any disclaimer, the term of this patent is extended or adjusted under 35 U.S.C. 154(b) by 455 days.

(21) Appl. No.: 12/435,610

(22) Filed: May 5, 2009

(65) Prior Publication Data

US 2010/0281664 A1 Nov. 11, 2010

(51) Int. Cl.
*B23P 19/00* (2006.01)
*B25D 9/04* (2006.01)

(52) U.S. Cl. ................................ 29/252; 29/726; 173/90

(58) Field of Classification Search .................... 29/252, 29/726, 726.5; 227/2–7, 61, 156; 81/25, 81/27

See application file for complete search history.

(56) References Cited

U.S. PATENT DOCUMENTS 1,541,522 A * 6/1925 Oehm al. ................... 404/133.1
3,335,810 A 8/1967 McColl
3,796,365 A * 3/1974 Downing .......................... 227/8
3,810,676 A * 5/1974 Clarke ........................... 299/1.5
3,990,836 A * 11/1976 Bricmont ........................ 432/75
4,614,349 A 9/1986 Wenzel
4,852,661 A * 8/1989 Ellington ........................ 173/84
5,062,562 A * 11/1991 Michael ........................ 227/111
5,292,065 A 3/1994 Fiedrich
5,579,996 A 12/1996 Fiedrich
5,667,021 A * 9/1997 Bailey et al. .................... 173/21
5,879,491 A 3/1999 Kobayashi
5,957,378 A 9/1999 Fiedrich
6,018,138 A 1/2000 Kurita
6,152,377 A 11/2000 Fiedrich
6,220,523 B1 4/2001 Fiedrich
6,303,905 B1 10/2001 Chiles et al.
6,330,980 B1 12/2001 Fiedrich
6,474,198 B2 * 11/2002 Lowther ............................ 81/27
6,481,612 B1 * 11/2002 Mangone, Jr. ................ 227/130
6,543,663 B1 * 4/2003 Davis ................................ 227/2
6,626,446 B1 9/2003 Yosef
7,198,188 B2 * 4/2007 Dion et al. .................... 227/110
7,614,536 B2 * 11/2009 Shtylman ...................... 227/107

* cited by examiner

*Primary Examiner* — David B Thomas
(74) *Attorney, Agent, or Firm* — John H. Pearson, Esq.; Walter F. Dawson, Esq.; Pearson & Pearson, LLP

(57) ABSTRACT

A tool for installing tubing in channels of floor panels comprises a handle attached to an upper portion of a front frame and a pair of wheels attached to a bottom portion of the front frame, a pneumatic drive, mounted between a front frame spacer and a bearing block, drives a hammer assembly for pushing the tubing into the channels, and a steering block is secured under the bearing block by a bearing assembly which enables the steering block to rotate about a bearing. An upper portion of a rear strut attaches to the bearing block and a pair of wheels attach to the lower portion of the rear strut. The tool quickly and efficiently installs the tubing into the flooring channels as the tool is rolled along the floor panels when an air source is attached to an air coupling on the pneumatic drive.

21 Claims, 6 Drawing Sheets

TOOL FOR INSTALLATION OF TUBING IN FLOORING

BACKGROUND OF THE INVENTION

1. Field of the Invention

This invention relates generally to the installation of radiant floor heating in a dwelling or commercial building and, in particular, to a tool for rapid installation of tubing within channels of flooring.

2. Description of Related Art

Radiant floor heating (RFH) comprises tubing installed in channels of flooring which may be made of wood boards or artificial radiant heating panels such as QUICK TRAK™ manufactured by Wirsbo Company of Apple Valley, Minn. It is commonly known in the art for an installation of RFH tubing to wear hard sole shoes and use the weight of the installer's body to press the tubing into the channels of the flooring. However, it is a common practice for installers to use a rubber mallet to hammer the tubing into the channels of the flooring. This installation technique is very time consuming and tiresome for installers.

U.S. Pat. No. 4,614,347 issued Sep. 30, 1986 to Michael D. Wenzel discloses a tool for installing floor coverings of the glued-down type such as carpet or linoleum. Retractable wheels and a pivotable, adjustable position handle enables the tool to be used as either a press, riding on glides that contact the floor covering, or as a hand truck for carrying the installer's tools and supplies. However, it is not suitable for the rapid installation of tubing in channels of flooring.

U.S. Pat. No. 6,879,491 issued Mar. 9, 1999 to Kiyoo Kobayashi discloses a method of installing a floor heating apparatus comprising positioning a tube assembly on an adhesive applied on a surface of a floor base structure so that the lower face of a base plate of the tube assembly is bonded to the floor base structure. A self leveling material is poured and extended on the tube assembly. By this method a number of floor heating pipes can be quickly and simply installed on a floor surface. This method does not require installing a single length of tubing in a channel.

U.S. Pat. No. 6,626,446 issued Sep. 30, 2003 to Hassan Yosef discloses a shopping cart comprising a chassis that supports a seat and comprises a plurality of wheels, a front section and a rear section wherein the rear section is swingably connected to the front section via an essentially vertical pivot that is disposed between a front section wheel pair and a rear section wheel pair in order to increase the maneuverability of the cart in narrow spaces. However, this apparatus does not disclose a pneumatic drive, plunger and hammer face for installing tubing.

SUMMARY OF THE INVENTION

Accordingly, it is therefore an object of this invention to provide a rolling tool to install tubing in channels of flooring in a quick, efficient manner using a pneumatic drive.

It is another object of the invention to provide a hammer assembly within the installation tool for pushing the tubing into channels of flooring.

It is a further object of this invention to provide a tool for installing radiant floor heating tubing in channels of flooring comprising a pneumatic drive having a hammer assembly.

It is yet another object of this invention to provide a method of installing tubing in channels of flooring comprising the steps of rolling a tool along a line of tubing over the channels and providing a pneumatic drive to hammer the tubing into the channels.

These and other objects are further accomplished by a tool for installing tubing in a channel of flooring comprising a front frame having a first pair of wheels attached to a lower portion, a rear strut having a second pair of wheels attached to a lower portion, means for supporting a pneumatic drive between the front frame and the rear strut, and a hammer assembly extending from the pneumatic drive for forcing the tubing into the channel of flooring. The tool comprises a handle bar attached to a top portion of the front frame. The pneumatic drive supporting means comprises a front frame spacer attached to a side of the front frame on one side of the pneumatic drive and a bearing block on the other side wherein the pneumatic drive is secured between the front frame spacer and the bearing block. The hammer assembly comprises a plunger sleeve attached to the pneumatic drive, wherein a bushing is inserted within the plunger sleeve and a plunger is inserted within the bushing, a lower end of the plunger extending below the plunger sleeve. The plunger comprises a hammer seat attached to a lower end of the plunger, and the hammer face is attached under and adjacent to the hammer seat. The pneumatic drive comprises an air coupling for connecting to an air hose. The front frame comprises a notch in a bottom portion of the front frame to guide the tool along the tubing.

The objects are further accomplished by a method for providing a tool for installing radiant floor heating tubing comprising the steps of providing a front frame having a first pair of wheels attached to a lower portion, providing a rear strut having a second pair of wheels attached to a lower portion, supporting a pneumatic drive between the front frame and the rear strut and extending a hammer assembly from the pneumatic drive for forcing the tubing into the channel of flooring. The method comprises the step of attaching a handle bar to a top portion of the front frame. The step of supporting the pneumatic drive comprises the step of attaching a front frame spacer to an inner surface of the front frame for contacting one side of the pneumatic drive and attaching a bearing block to the rear strut for contacting an opposite side wherein the pneumatic drive is secured between the front frame spacer and the bearing block. The step of extending a hammer assembly from the pneumatic drive comprises the step of inserting a bushing within the plunger sleeve, inserting a plunger within the bushing, and attaching the plunger sleeve to the pneumatic drive. The step of attaching a plunger sleeve to the pneumatic drive comprises the step of providing a plunger which extends from the plunger sleeve having a hammer seat attached to a lower end of the plunger, and providing a hammer face attached below and adjacent to the hammer seat. The method comprises the step of providing an air coupling means on the pneumatic drive for connecting to an air hose. The method comprises the step of providing a notch in a bottom portion of the front frame to guide the tool along the tubing.

Additional objects, features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
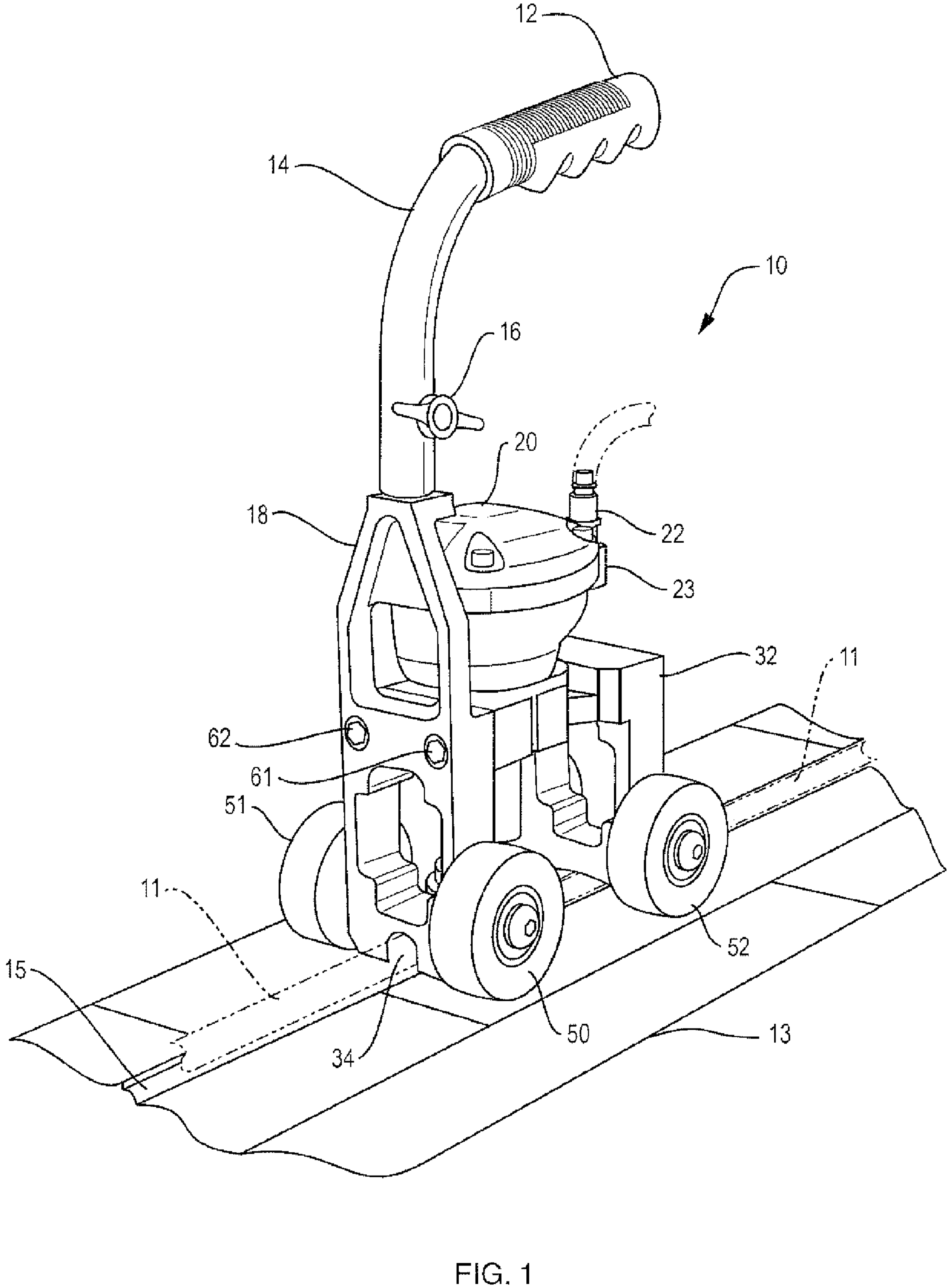
FIG. 1 is a perspective view of a tubing installation tool according to the present invention showing installation of tubing between floor boards.
Figure 2:
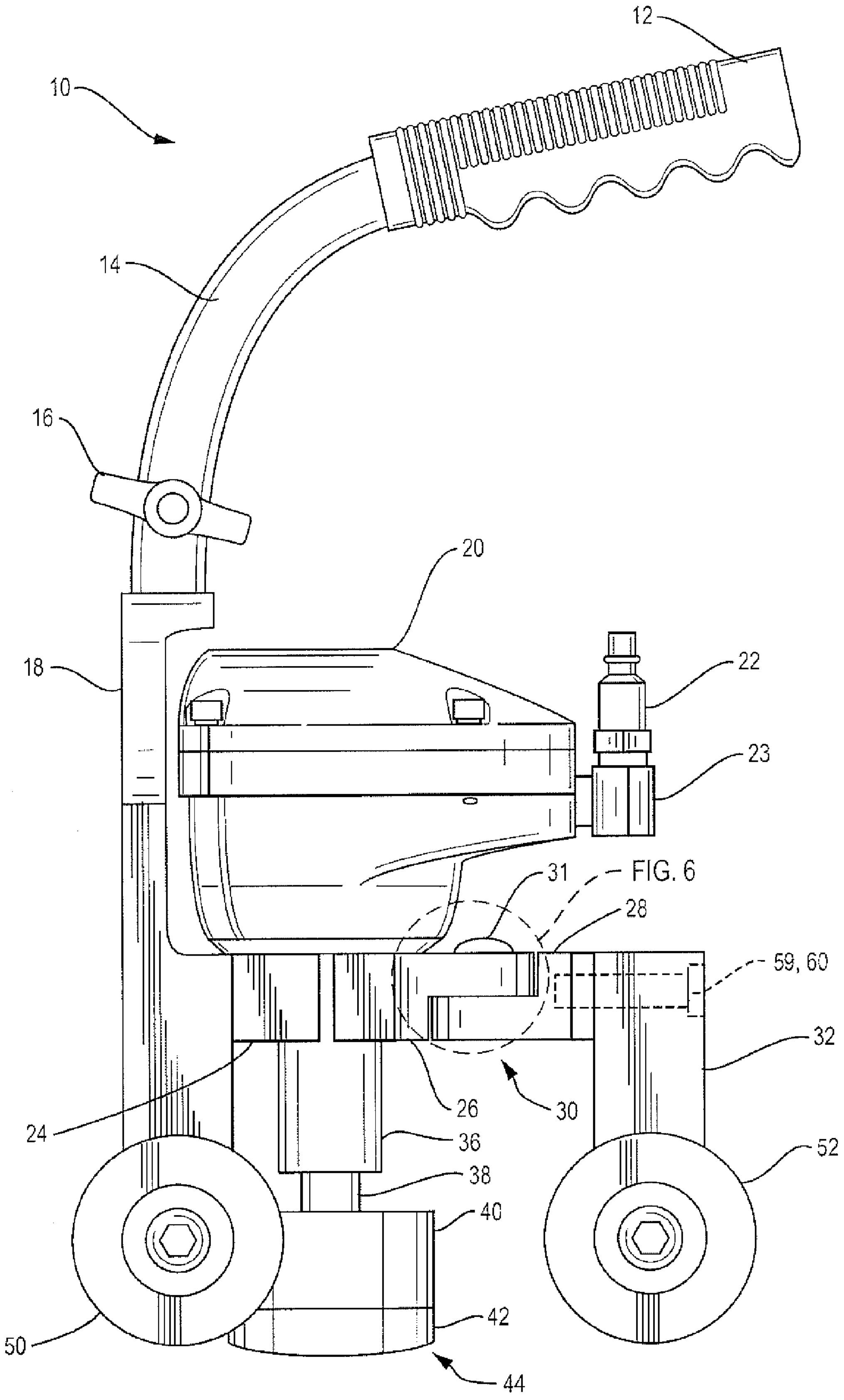
FIG. 2 is a side elevational view of the tubing installation tool.

Referring to FIG. 1 and FIG. 2, FIG. 1 is a perspective view of a tubing installation tool 10 according to the present invention showing the tool 10 installing the tubing 11 in a channel 15 of flooring panels 13. The tubing may be used for radiant floor heating. FIG. 2 is a side elevational view of the tubing installation tool 10. The tubing 11 is laid out over the channel 15, and as the tool 10 is rolled along the channel 15 by an operator, a hammer face 42 of hammer assembly 44, which is driven by a pneumatic drive 20, forces the tubing 11 into the channel 15. An operator can move along the channels 15 of the tubing panels 13 at a fairly rapid rate with little exertion.

The pneumatic drive 20 is positioned above a front frame spacer 24 and a bearing block 26 which have concave openings on facing sides for seating around a plunger sleeve 36 of the hammer assembly 44 which connects to and extends downward from the pneumatic drive 20. The pneumatic drive 20 is driven by compressed air provided by a hose that connects to an air coupling 22 which attaches to a right angle adaptor 23. The right angle adapter extends from an end of the pneumatic drive 20. The pneumatic drive 20 may be embodied by Palm Nailer model No. GRTPN600 distributed by Prime Source Building Products, Inc. The front frame spacer 24 is attached to the front frame 18 by a pair of bolts 61, 62. The bearing block 26 mates with a steering block 28 via a bearing assembly 30 which secures the bearing block 26 to the steering block 28 so that the steering block 28 can rotate approximately ±60° with respect to the bearing block 26.

Figure 6:
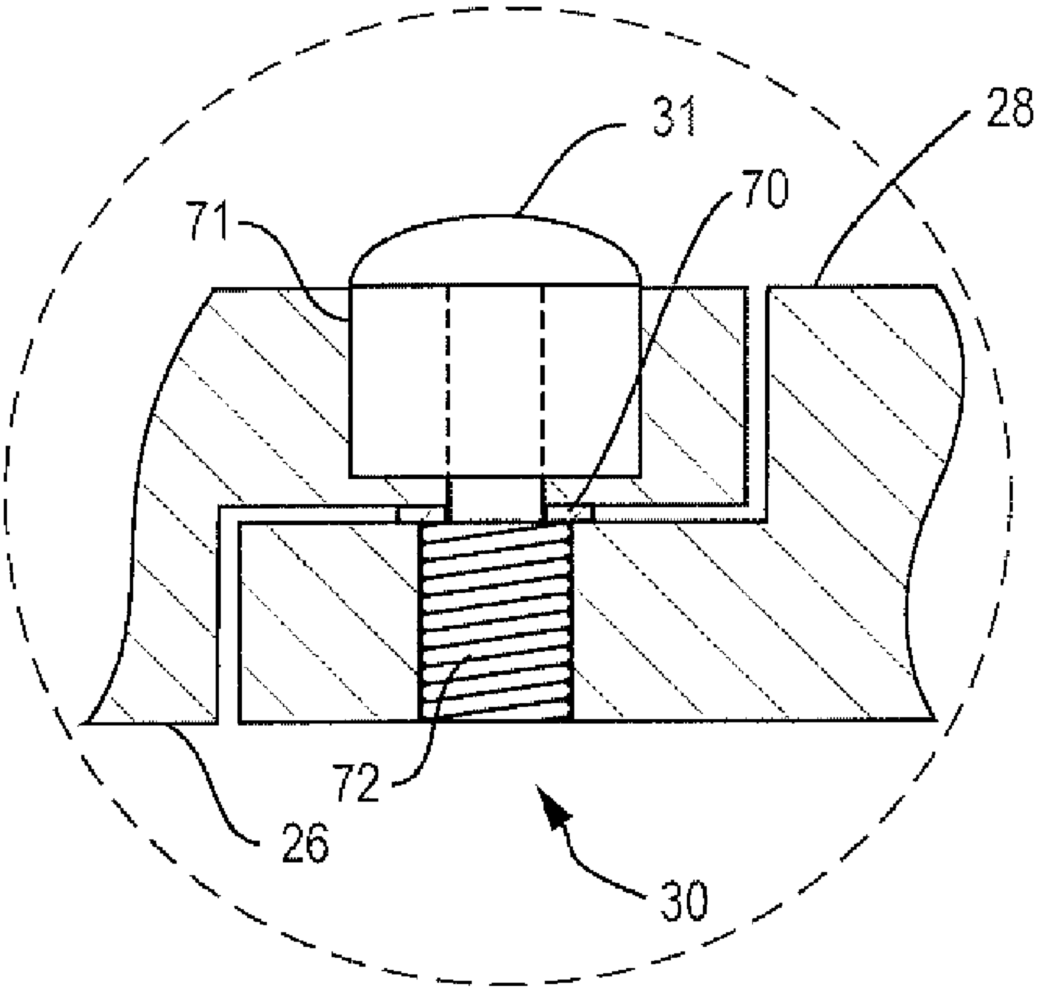
FIG. 6 is an enlarged partial section of a bearing assembly in FIG. 2.

Referring to FIG. 2 and FIG. 6, FIG. 6 is an enlarged partial section of the bearing assembly 30 comprising a bearing 71 inserted within the bearing block 26, a spacer 70 positioned between the bearing block 26 and the steering block 28, and a locking threaded coil 72 of steel wire having a diamond cross-section, inserted within the steering block 28 and centered under the bearing 71 and in the steering block 28. A button head screw 31 is inserted into the bearing 71 and secured within the locking threaded coil 72, which may be embodied by a Heli-coil (registered trademark) supplied by DB Roberts Company, Part No. 3585-6cn-0375. The bearing 7, may be embodied by part No. 6384K23 supplied by Mastercarr.com.

A handle bar 14 attaches to a cylindrical stud protruding approximately 2 inches from the top surface of the front frame 18, and a wing nut 16 secures the handle bar 14 to the cylindrical stud (not shown). A handle grip 12 is positioned on the end of the handle bar 14 which is made of a common rubber material.

Figure 5:
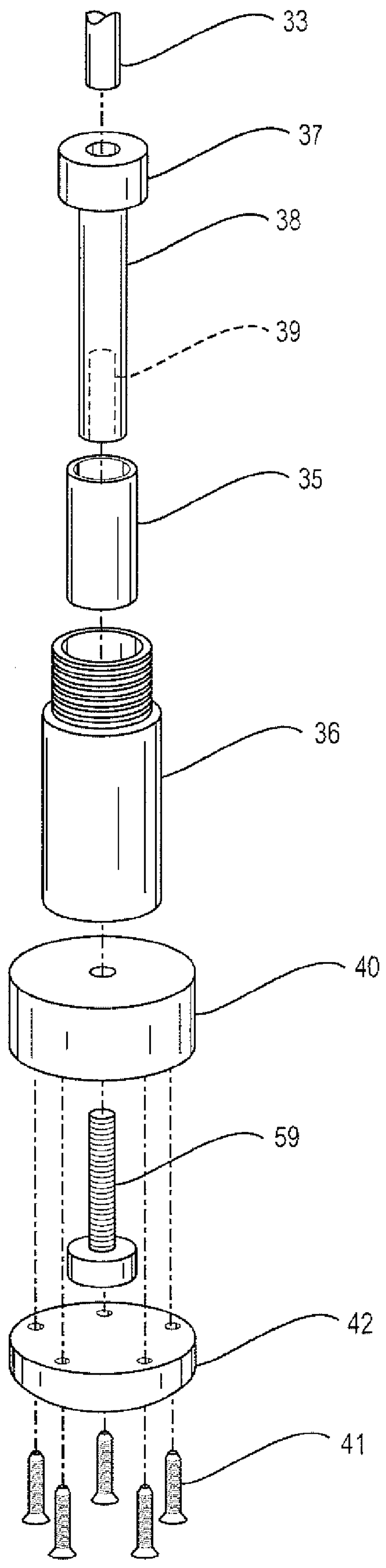
FIG. 5 is an exploded view of a hammer assembly of the tubing installation tool.

Referring to FIG. 2 and FIG. 5, FIG. 5 is an exploded view of a hammer assembly 44 which attaches to the bottom of the pneumatic drive 20. The hammer assembly 44 comprises a plunger sleeve 36 with an upper end being threaded for attaching the plunger sleeve 36 to the pneumatic drive 20. A bushing 35 is inserted into the plunger sleeve 36. The bushing 35 is made of oil impregnated bronze and it may be embodied by Part No. 639111205 supplied by Mastercarr.com. A plunger 38 comprises a collar 37 at the upper end for stable movement when the plunger 38 inserted within the plunger sleeve 36 as it moves up and down. A hammer seat 40 attaches to the lower end of cylindrical plunger 38. A cap screw 59 fits into a hole in the lower end of the hammer seat 40 extending therethrough and it screws into a threaded hole 39 in the lower end of the plunger 38, thereby securing the hammer seat 40 to the plunger 38. Flat head screws 41 attach the hammer face 42 to the hammer seat 40. The hammer face 42 comprises an ultra high molecular weight (UHMW) polyethylene material to prevent excessive wearing because of the constant contact of the hammer face 41 with the tubing 11 and flooring 13 during installation of tubing 11 in to the grooves in the flooring 13. The plunger sleeve 36, the plunger 38 and the hammer seat 40 are embodied with 1018 steel.

Figure 3:
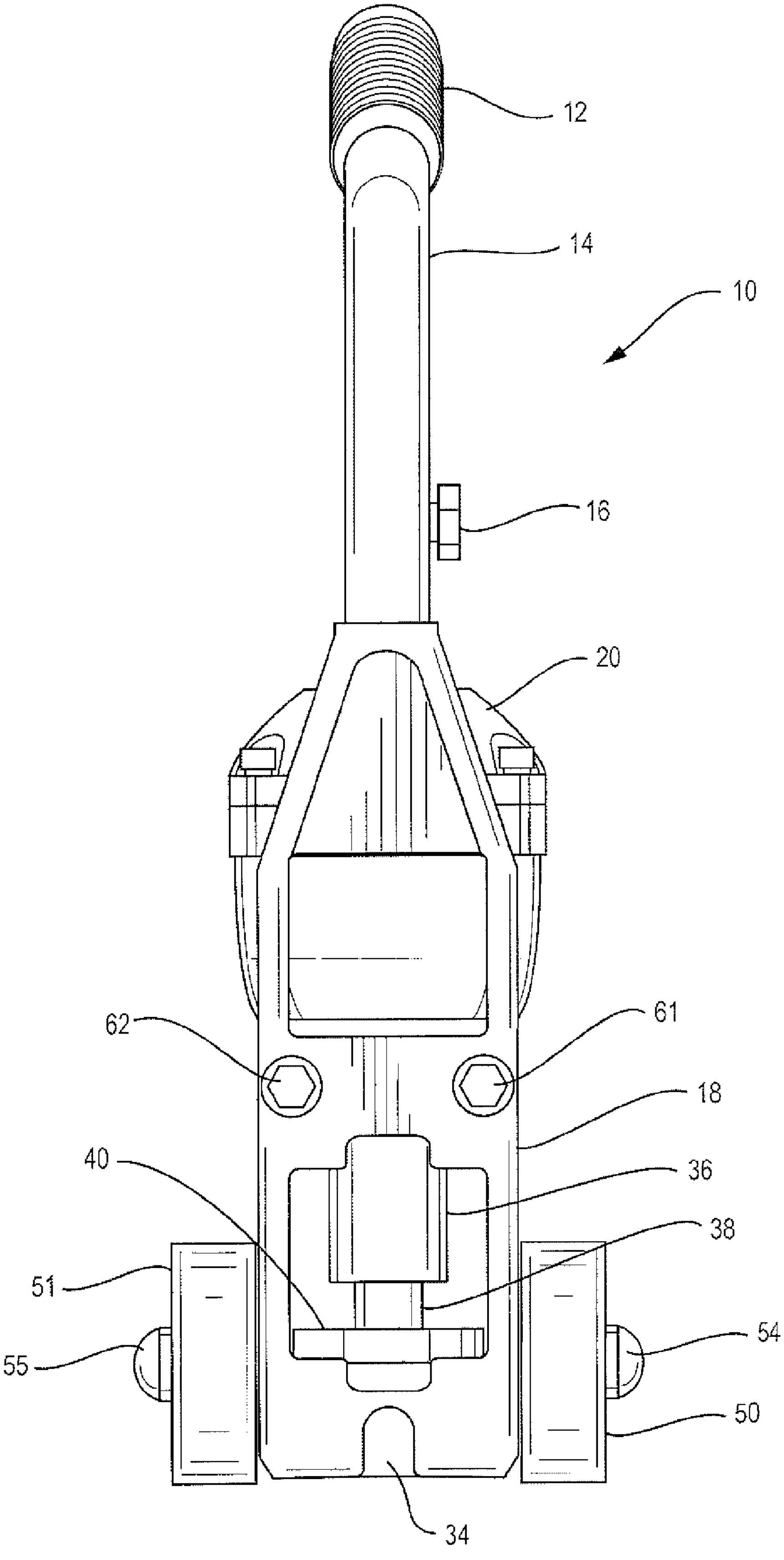
FIG. 3 is a front elevational view of the tubing installation tool.

Referring to FIG. 1 and FIG. 3, FIG. 3 is a front elevational view of the tubing installation tool 10 showing a notch 34 in the lower portion of the front frame 18 which is used to guide the tool 10 along the laid out line of radiant floor heating tubing 11 as shown in FIG. 1. Front wheels 50, 51 are shown mounted on each side of the front frame 18 with button head screws 54, 55 holding the wheels 50, 51 in place on the front frame 18. Cap screw 60, 61 attach the front frame spacer 24 to the front frame 18.

Figure 4:
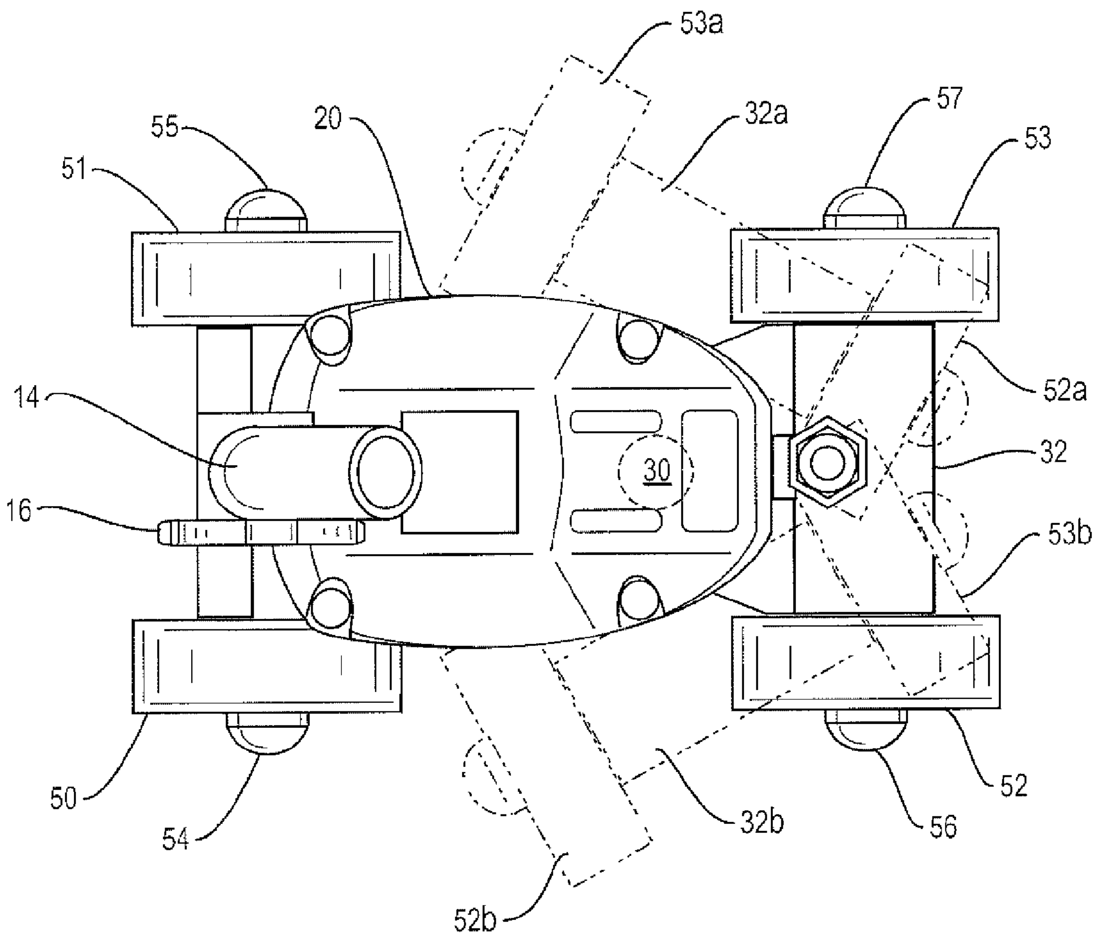
FIG. 4 is a top plan view of the present invention showing the steering section and alternate positions of the steering section.

Referring to FIG. 4, a top plan view of the present invention shows the range of motion of the steering block 28 which pivots about the bearing assembly 30. The dash/dot lines illustrate the maximum pivoting of approximately +60° of the rear strut 32_a_ with wheels 52_a_ and 52_b_, and the maximum pivoting of approximately −60° of the rear strut 32_b_ with wheels 52_b_ and 53_b_. The range of motion of the rear strut 32 (32_a_ and 32_b_) enables the tool 10 to be easily steered as an operator moves the tool along a line of tubing 11.

This invention has been disclosed in terms of a certain embodiment. It will be apparent that many modifications can be made to the disclosed apparatus without departing from the invention. Therefore, it is the intent of the appended claims to cover all such variations and modifications as come within the true spirit and scope of this invention.

What is claimed is:

1. A tool for installing tubing in a channel of flooring comprising:
- a front frame having a first pair of wheels attached to a lower portion;
- a rear strut having a second pair of wheels attached to a lower portion;
- a pneumatic drive;
- means for supporting said pneumatic drive between said front frame and said rear strut; and
- a hammer assembly extending from said pneumatic drive for forcing said tubing into said channel of flooring.

2. The tool as recited in claim 1 wherein said tool comprises a handle bar attached to a top portion of said front frame.

3. The tool as recited in claim 1 wherein said pneumatic drive supporting means comprises a front frame spacer attached to a side of said front frame on one side of said pneumatic drive and a bearing block on the other side wherein said pneumatic drive is secured between said front frame spacer and said bearing block.

4. The tool as recited in claim 1 wherein said hammer assembly comprises a plunger sleeve attached to said pneumatic drive, wherein a bushing is inserted within said plunger sleeve and a plunger is inserted within said bushing, a lower end of said plunger extending below said plunger sleeve.

5. The tool as recited in claim 4 wherein said hammer assembly comprises a hammer seat attached to a lower end of said plunger, and a hammer face is attached under and adjacent to said hammer seat.

6. The tool as recited in claim 1 wherein said pneumatic drive comprises an air coupling for connecting to an air hose.

7. The tool as recited in claim 1 wherein said front frame comprises a notch in a bottom portion of said front frame to guide said tool along said tubing.

8. An installation tool for tubing comprising:

a front frame having a front frame spacer attached to an inner surface of said front frame;

a handle bar attached to an upper portion of said front frame;

a rear strut having a steering block attached thereto;

a bearing assembly attached to said bearing block and said steering block for pivoting said rear strut;

a pneumatic drive secured between said front frame spacer and said bearing block;

a hammer assembly attached to said pneumatic drive and extending to a lower portion of said tool for driving said tubing into a channel on flooring; and a first pair of wheels attached to said front frame and a second pair of wheels attached to said rear strut.

9. The installation tool as recited in claim 8 wherein said handle bar attaches to a stud extending from an upper portion of said front frame.

10. The installation tool as recited in claim 8 wherein said bearing assembly comprises a bearing inserted into said bearing block and a locking coil inserted into said steering block for receiving a screw passing through said bearing into said locking coil.

11. The installation tool as recited in claim 8 wherein said pneumatic drive comprises means for connecting an air hose to said pneumatic drive.

12. The installation tool as recited in claim 8 wherein said hammer assembly comprises:

a plunger sleeve which attaches to said pneumatic drive;

a bushing inserted within said plunger sleeve; and a plunger inserted within said bushing, said plunger extending below a lower end of said plunger sleeve.

13. The installation tool as recited in claim 12 wherein said hammer assembly comprises a hammer seat attached to a lower end of said plunger, and a hammer face is attached under and adjacent to said hammer seat.

14. The installation tool as recited in claim 8 wherein said front frame comprises a notch in a bottom portion of said front frame to guide said tool along said tubing.

15. A method for providing a tool for installing radiant floor heating tubing comprising the steps of:

providing a front frame having a first pair of wheels attached to a lower portion;

providing a rear strut having a second pair of wheels attached to a lower portion;

supporting a pneumatic drive between said front frame and said rear strut; and extending a hammer assembly from said pneumatic drive for forcing said tubing into said channel of flooring.

16. The method as recited in claim 15 wherein said method comprises the step of attaching a handle bar to a top portion of said front frame.

17. The method as recited in claim 15 wherein said step of supporting said pneumatic drive comprises the step of attaching a front frame spacer to an inner surface of said front frame for contacting one side of said pneumatic drive and attaching a bearing block to said rear strut for contacting an opposite side of said pneumatic drive wherein said pneumatic drive is secured in said tool between said front frame spacer and said bearing block.

18. The method as recited in claim 15 wherein said step of extending a hammer assembly from said pneumatic drive comprises the step of inserting a bushing within said plunger sleeve, inserting a plunger within said bushing, and attaching a plunger sleeve to said pneumatic drive.

19. The method as recited in claim 18 wherein said step of attaching a plunger sleeve to said pneumatic drive comprises the step of:

providing a plunger which extends from said plunger sleeve having a hammer seat attached to a lower end of said plunger; and providing a hammer face attached below and adjacent to said hammer seat.

20. The method as recited in claim 15 wherein said method comprises the step of providing an air coupling means on said pneumatic drive for connecting to an air hose.

21. The method as recited in claim 15 wherein said method comprises the step of providing a notch in a bottom portion of said front frame to guide said tool along said tubing.

* * * * *